United States Patent
Rimondi

(10) Patent No.: US 7,165,378 B2
(45) Date of Patent: Jan. 23, 2007

(54) PROCESS AND MACHINE FOR THE PACKAGING OF PRODUCTS WITH STRETCHABLE THERMOPLASTIC FILM, PARTICULARLY OF THE BARRIER TYPE

(75) Inventor: Renato Rimondi, Bazzano (IT)

(73) Assignee: A.W.A.X. Progettazione E Ricerca S.r.l. (IT)

( * ) Notice: Subject to any disclaimer, the term of this patent is extended or adjusted under 35 U.S.C. 154(b) by 0 days.

(21) Appl. No.: 11/332,535

(22) Filed: Jan. 17, 2006

(65) Prior Publication Data

US 2006/0112665 A1 Jun. 1, 2006

Related U.S. Application Data

(62) Division of application No. 10/496,115, filed as application No. PCT/EP02/14206 on Dec. 13, 2002, now Pat. No. 7,076,930.

(51) Int. Cl.
*B65B 9/20* (2006.01)
*B65B 31/00* (2006.01)

(52) U.S. Cl. .............................. 53/550; 53/258; 53/530; 53/556

(58) Field of Classification Search ................... 53/556
See application file for complete search history.

(56) References Cited

U.S. PATENT DOCUMENTS 2,914,893 A 12/1959 Berst ............................ 53/441

(Continued)

FOREIGN PATENT DOCUMENTS

GB 2 124 176 A 2/1984

(Continued)

OTHER PUBLICATIONS

Patent Abstracts of Japan vol. 015, No. 468 (M-1184), Nov. 27, 1991 & JP 03 200505 A (Omori Mach Co Ltd), Sep. 2, 1991, abstract.

*Primary Examiner*—John Sipos
(74) *Attorney, Agent, or Firm*—Stites & Harbison PLLC; Marvin Petry

(57) ABSTRACT

A machine for the packaging of products with stretchable and thermoplastic film, comprising of a tubularization means comprising a tubular forming head device having an inlet and an outlet, for the tubularization of a wrapping film taken from a feeding bobbin and means for the longitudinal tight-seal welding of the superimposed edges of such tubularization film; means which alternate in the transversal grip of the head of the tubular wrapping which comes out from the tubularization means, which are pre-arranged for the longitudinal movement of the wrapping, to longitudinally stretch it and to perform on same at least two transversal, parallel and tight seal weldings, a transversal cut placed between the weldings and to retain the wrapping upstream and downstream of the two welded zones separated by the cut; means for the cyclical introduction of a product through the inlet of the tubularization means and through the outlet of the tubularization means thereby advancing the tubular wrapping film; means to temporarily support the film wrapped packaging being formed downstream of the tubularization means; means to brake the forward movement of the tubular wrapping film by pressing it against the outlet end of the forming head device to longitudinally stretch the wrapping in its formation phase, under the action of the active introducing means and one of the gripping, double welding and interposed cutting means; and a conveyor for the taking and the moving away of the cyclically formed packaging.

27 Claims, 7 Drawing Sheets

U.S. PATENT DOCUMENTS

| | | |
|---|---|---|
| 3,274,746 A | 9/1966 | James et al. |
| 3,589,091 A | 6/1971 | Cloud ......................... 53/399 |
| 3,816,969 A | 6/1974 | Zimmerman et al. |
| 3,958,390 A | 5/1976 | Pringle et al. ................. 53/450 |
| 4,033,089 A | 7/1977 | Byland |
| 4,144,697 A | 3/1979 | Suga ........................... 53/556 |
| 4,160,305 A * | 7/1979 | Tysver ......................... 452/39 |
| 4,464,882 A * | 8/1984 | Van Ginkel et al. .......... 53/530 |
| 4,872,302 A | 10/1989 | van Eijsden et al. |
| 5,197,914 A * | 3/1993 | Powers ......................... 452/32 |
| 5,237,800 A | 8/1993 | Omori .......................... 53/450 |
| 5,341,623 A | 8/1994 | Siegel .......................... 53/450 |
| 5,653,093 A | 8/1997 | Delledonne ................... 53/441 |
| 6,645,062 B1 * | 11/2003 | Buckles ........................ 452/35 |

FOREIGN PATENT DOCUMENTS

| | | |
|---|---|---|
| GB | 2 233 305 A | 1/1991 |
| WO | WO 02/066329 | 8/2002 |

* cited by examiner

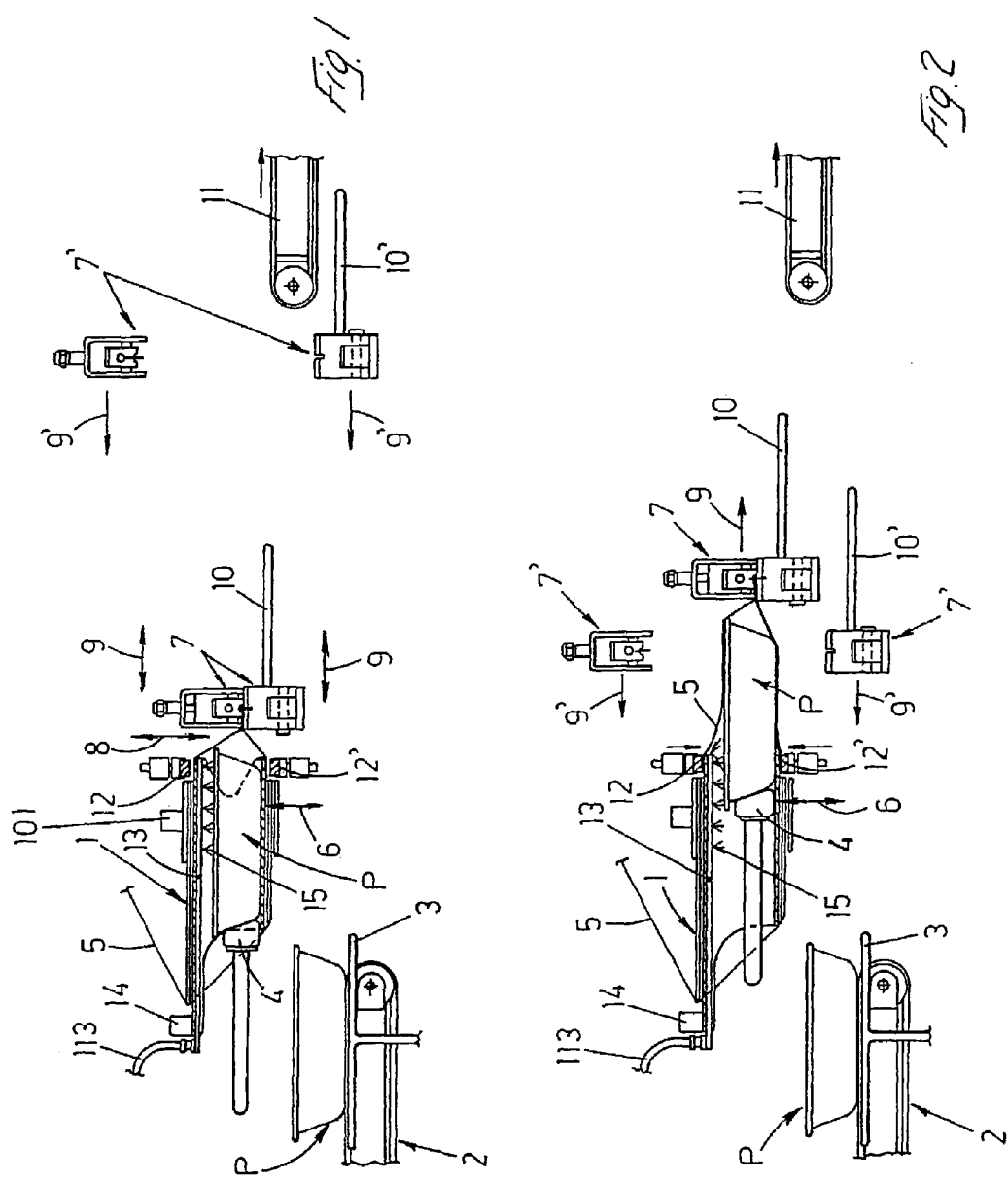

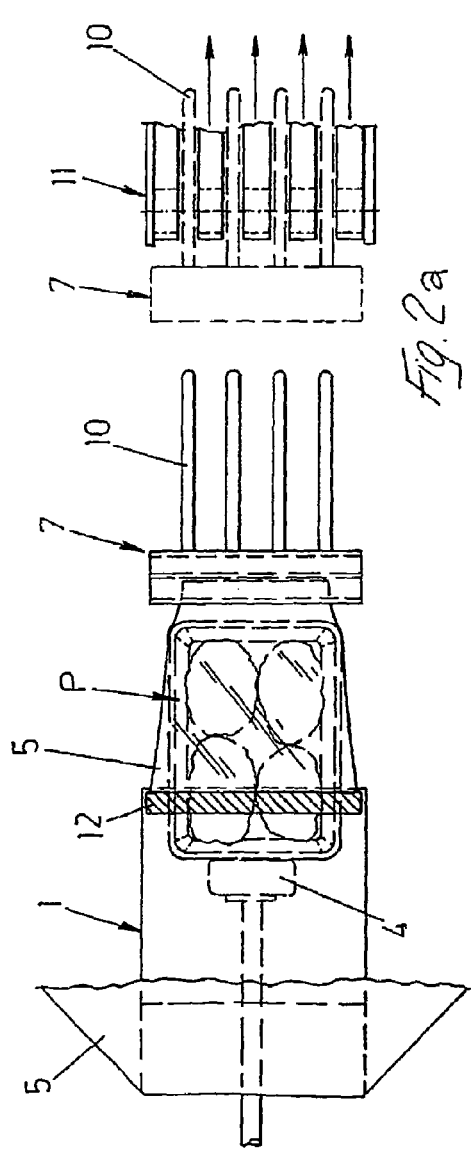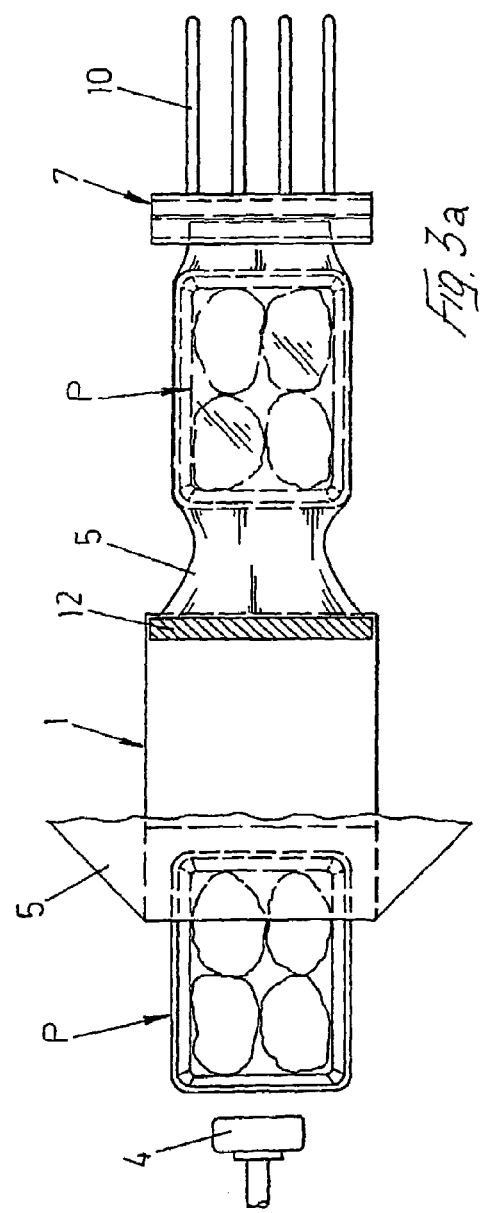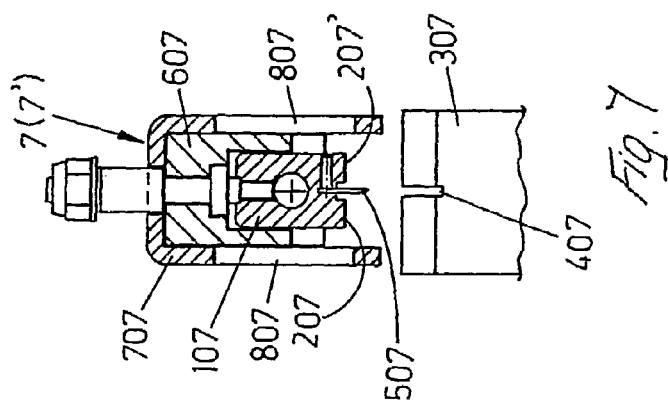

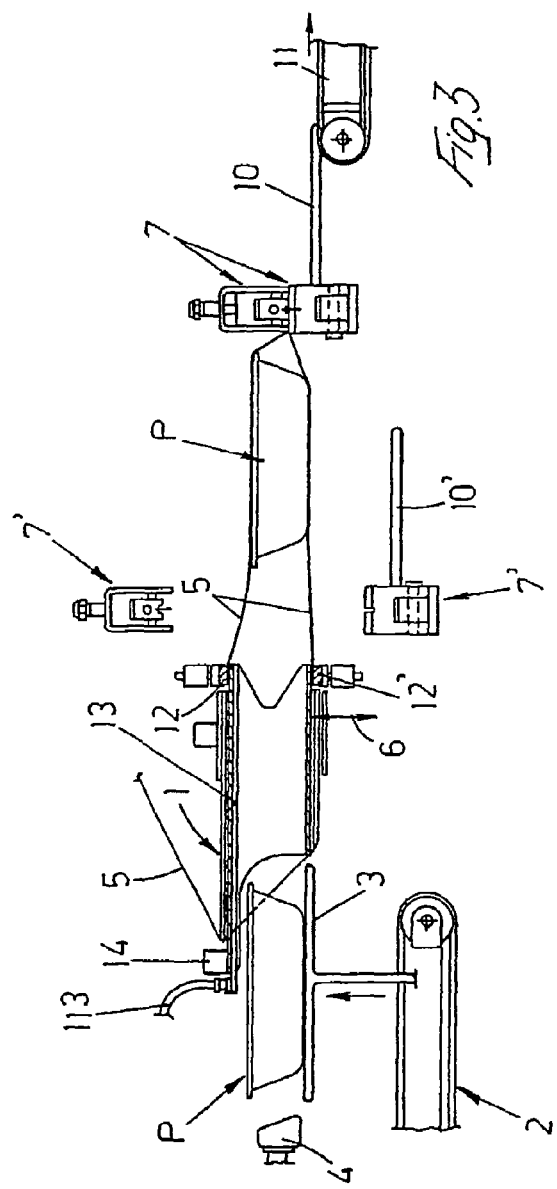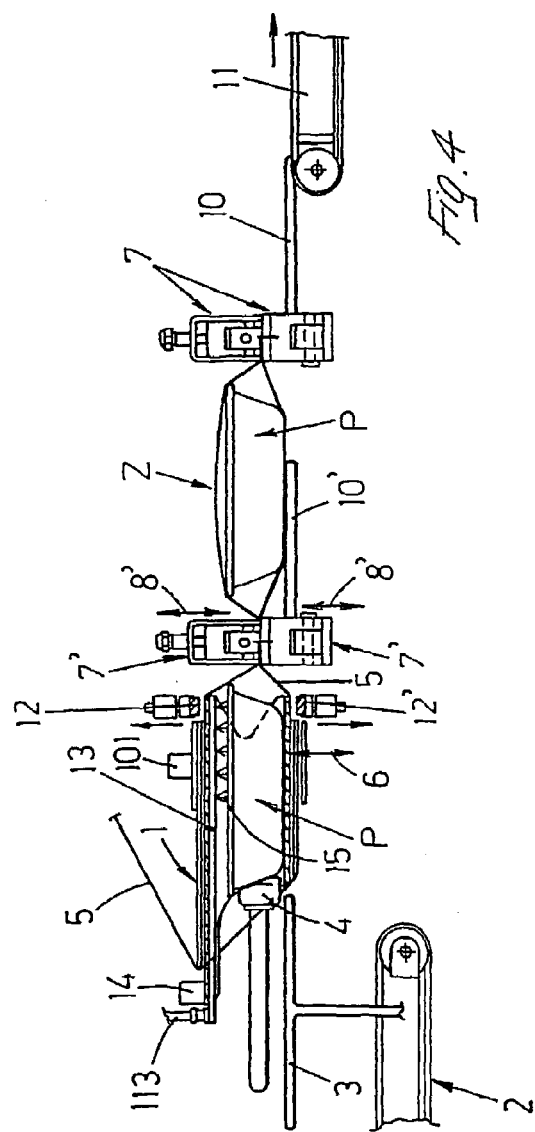

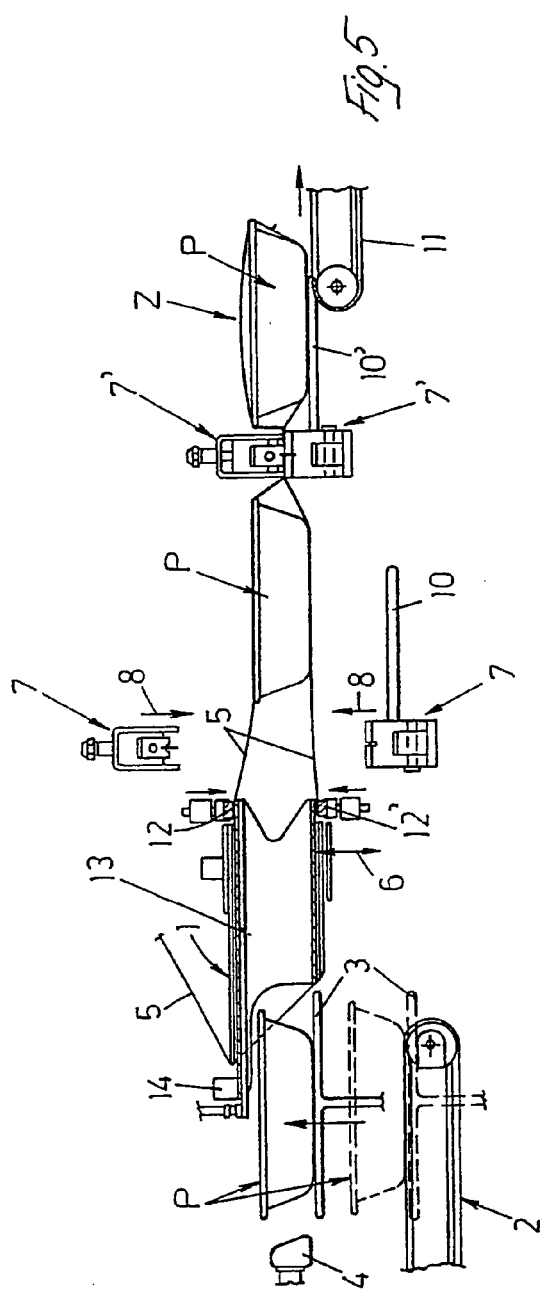
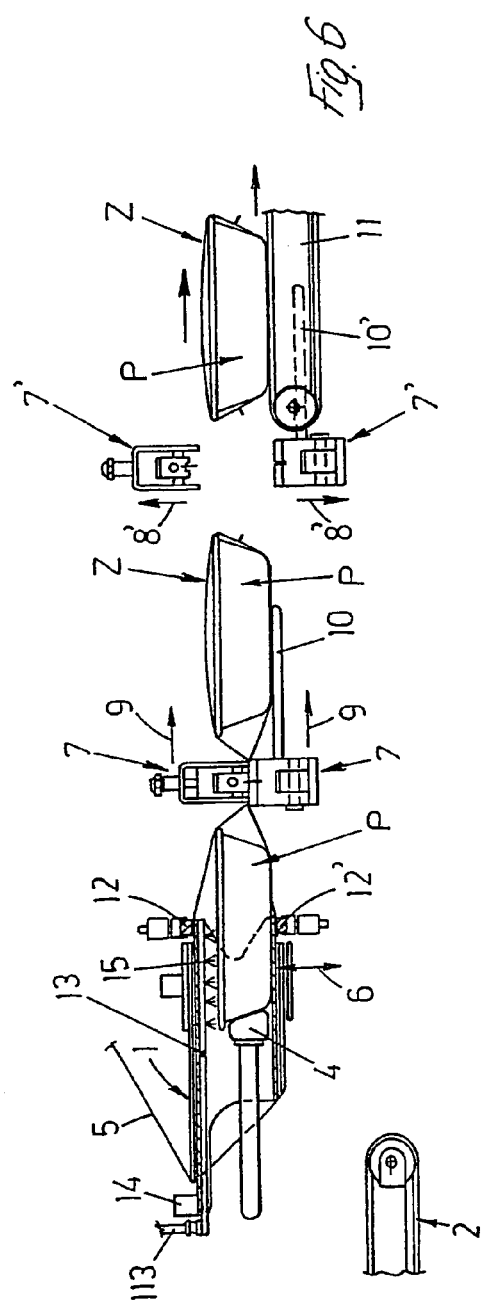

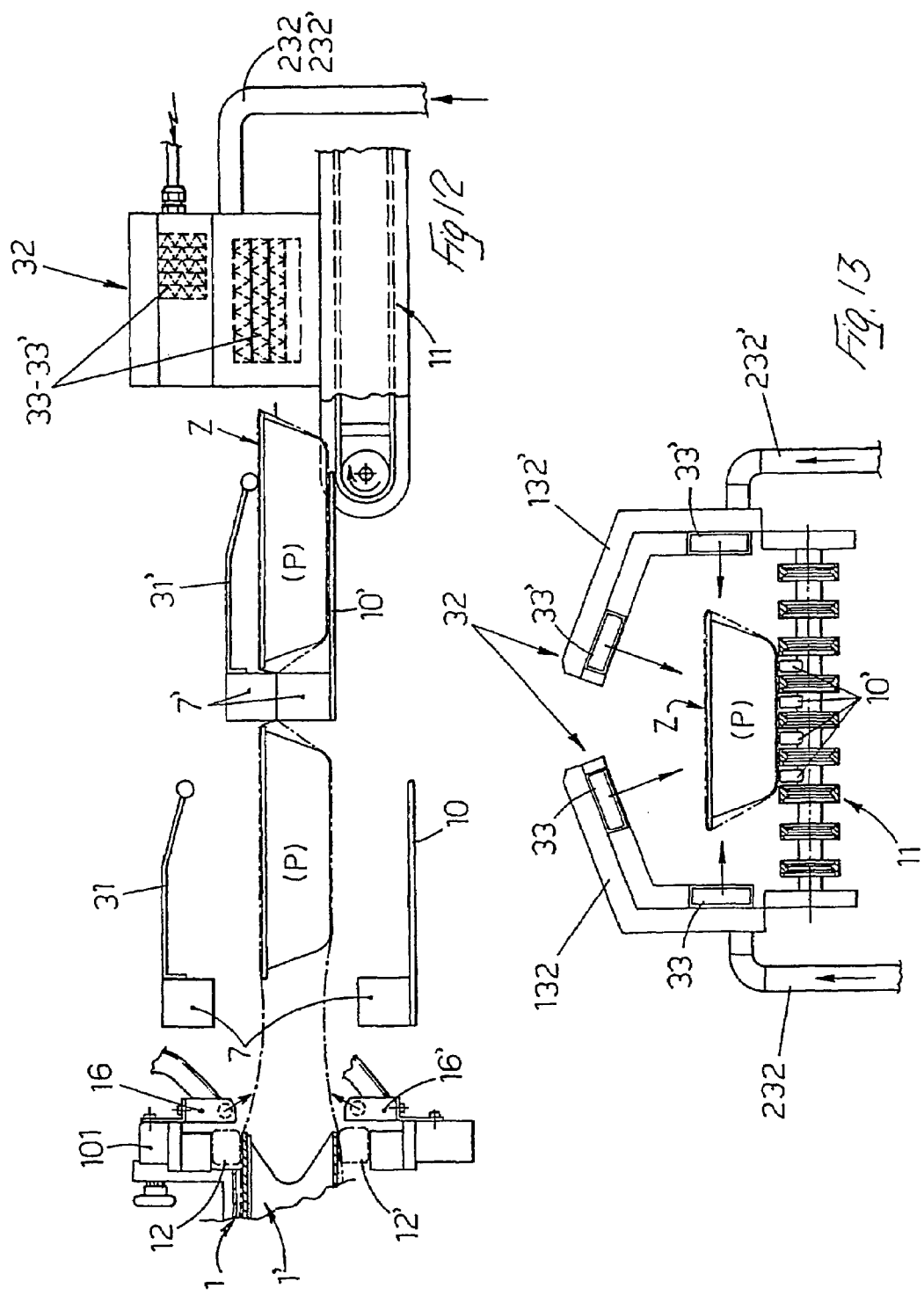

PROCESS AND MACHINE FOR THE PACKAGING OF PRODUCTS WITH STRETCHABLE THERMOPLASTIC FILM, PARTICULARLY OF THE BARRIER TYPE

This is a divisional of U.S. application Ser. No. 10/496,115 now U.S. Pat. No. 7,076,930 which is a 371 of PCT/EP02/14206, Dec. 13, 2002, filed May 19, 2004.

The invention relates to a process and machine for the packaging of products placed in trays, particularly of food products, with a thermoplastic and stretchable film particularly of the gas-proof type or the so-called barrier type. The whole of the product and of the tray will be hereafter named "product".

The present invention intends to protect both a method and a machine for the realisation of packagings of products with thermoplastic and stretchable film, and subordinately the same method and machine for the packaging of products in modified atmosphere, with stretchable thermoplastic and gas-proof film (so-called barrier film).

The process which presently is used by the majority of machines for the packaging of products with wrappings of stretchable film, provides to horizontally arrange a portion of the film unwound from the bobbin, to subject same to a possible longitudinal and/or transversal pre-stretch, then to arrange the product to be packaged below said film and to raise same against the said film, after which the four edges of the film are in correct phase bent and spread under the product which in succession is discharged from the wrapping station and it is moved to a thermowelding station which provides to reciprocally weld the superimposed edges of the wrapping film.

With this method it is not possible to package very fragile products which may risk to be damaged by the pressure of the film during the wrapping phase and it is not possible to obtain high production speeds, because of the alternation of the working cycles, also due to the fact that in the packaging station the product must follow a ninety degrees path, with temporary stop in the wrapping station where the raised product must then be horizontally moved. With this same method it is very difficult to obtain tight-seal packages, because the superimposition of the edges occurs with patterns which are always random and because in the superimposed edges there may be created plies which also after the welding originate little channels through which the product results to be in communication with the outside. It is therefore difficult, with the traditional method above mentioned, to realise wrappings with stretchable and gas-proof films, in order to obtain packaging of food products in modified atmosphere.

Document GB 2 233 305 A (CASSINELLI) represents the closest known prior art and discloses a process and machine for the packaging of products with stretchable film, comprising the following working steps:

tubularisation of a stretchable and thermoplastic film unwound from a feeding bobbin, with longitudinal welding of its longitudinal edges, in such a manner to form a continuous tube, arranged almost horizontally and having a transversal section with a width which is suitable for the introduction of the product to be packaged;

sealing, with at least one transversal welding, of the head of said film which comes out from the tubularisation and longitudinal welding phase;

introduction of the product, inside of the tubular wrapping portion, closed and anteriorly supported, in such a manner to result near to said anterior end of the tubular wrapping;

closing with at least a transversal welding, of the posterior end of the tubular packaging longitudinally stretched, further closing with at least another transversal welding of the head of the tubular wrapping which follows the formed packaging, transversal cutting of the tubular wrapping film in the zone lying between the two said weldings, while the head of the new tubular wrapping is retained, while the tail of the formed packaging is also retained too, while said packaging is horizontally supported and while in correct phase the head of the same packaging is abandoned, in such a manner that the film which composes the same can longitudinally react to close adhere also in this sense to the packaged product.

A similar process and machine is also disclosed by document U.S. Pat. No. 4,872,302 (VAN EIJSDEN) which however does not contemplate the use of double gripping, double welding and cutting means which alternate in the gripping of the head and of the tail of the packaging being formed.

According to the present invention, there is provided a method and machine of the type disclosed above, characterised by the fact of further comprising the steps of:

supporting the transversally closed head which comes out of the tubularisation and welding phase, in such a manner that the same tube remains in a substantially horizontal position;

transversal braking of the wrapping film is in a zone which does not touch the product (P);

longitudinal stretching of the portion of the tubular wrapping posteriorly blocked, the whole in such a manner that said wrapping portion assumes a length which is superior to the length of the incorporated product, while the same wrapping, because of the reaction to the stretching, tightens transversally on the product and wraps it in a close manner;

interruption of the transversal braking action of the packaging film, in correct phase with the closure of the posterior end of the formed packaging;

abandon of the grip of the posterior end of the formed packaging (Z) and displacement of this latter from the packaging zone With this method it is possible to realise packages which besides being blocked and tightly adhering to the product, are perfectly tight-sealed, so that by using stretchable and gas-proof (or impermeable to some gases) film, the same packages can result suitable to improve the conservation of fresh fruit and vegetable products, limiting the passage of oxygen and favouring the elimination of carbon dioxide, or suitable to contain products in modified atmosphere. For this last purpose, suitable means are provided for the conditioning of the atmosphere in the tubular packaging prior to its posterior closure or to realise the whole packaging operation in a modified atmosphere chamber.

Further features of the invention, and the advantages deriving therefrom, will appear better evident from the following description of a preferred embodiment of same, made by way of non-limiting example, with reference to the figures of the attached sheets of drawings, in which:

With this method it is possible to realise packages which besides being blocked and tightly adhering to the product, are perfectly tight-sealed, so that by using stretchable and gas-proof (or impermeable to some gases) film, the same packages can result suitable to improve the conservation of fresh fruit and vegetable products, limiting the passage of oxygen and favouring the elimination of carbon dioxide, or suitable to contain products in modified atmosphere. For this last purpose, suitable means are provided for the conditioning of the atmosphere in the tubular packaging prior to its posterior closure or to realise the whole packaging operation in a modified atmosphere chamber.

Further features of the invention, and the advantages deriving therefrom, will appear better evident from the following description of a preferred embodiment of same, made by way of non-limiting example, with reference to the figures of the attached sheets of drawings, in which:

FIGS. 1, 2, 3, 4, 5, 6 show, in lateral elevation and schematically, the main components of the machine during the subsequent phases of their working cycle;

FIGS. 2a and 3a show in plan view from the top the components of the machine in the same phases of the respective FIGS. 2 and 3;

FIG. 7 shows in enlarged view, transversally sectioned and according to a possible embodiment, one of the two units of double unit clamping, double welding and interposed transversal cutting of the tubularised wrapping film of the products to be packaged;

FIGS. 8 and 9 are respectively views in side elevation and in plan from the top of the wrapping station of the machine, during the phase of longitudinal stretching of the packaging being formed as from the previous FIGS. 3 and 3a;

FIGS. 12 and 13 are respectively views in side elevation and in elevation from the discharging front, of the wrapping station of the machine with further improvements.

Figure 8:
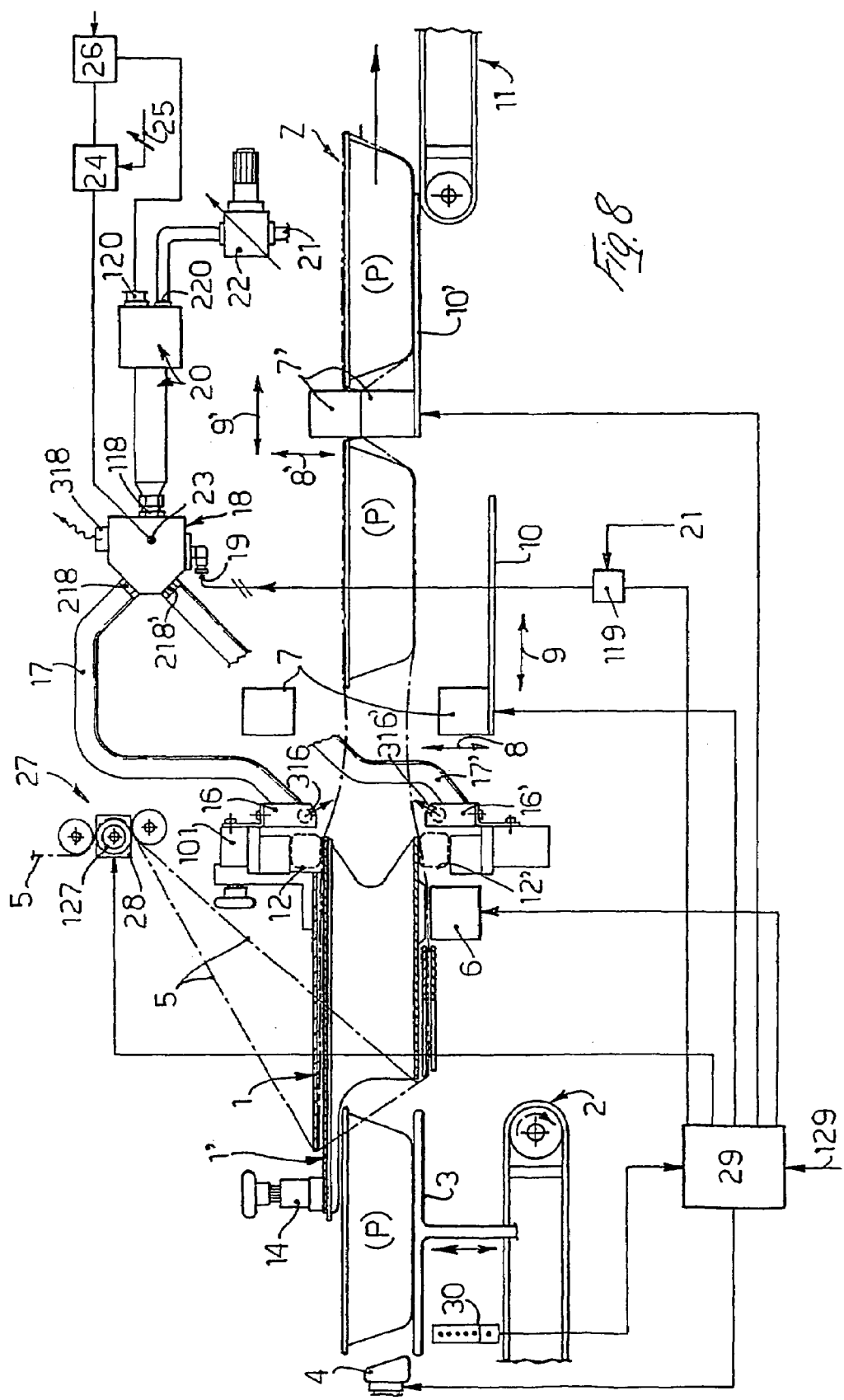

From FIG. 1 it is noted that the machine comprises a known forming head device 1, fixed or adjustable if required, constituted by external bending portions supported by means of supports 101 and comprising an internal tube supported by means of external portions 14, arranged almost horizontally, having for example a rectangular section and which is such to be traversed with sufficient clearance by the product P to be packaged which usually is placed inside a tray, which is coming for example in single row by an underlying feeding line 2, which, at least in its terminal portion is comb-shaped and co-operates with a lifting device 3 having a complementary shape, which as illustrated in the sequence of the FIGS. 1, 2 and 3 lifts upon command the product in alignment to the bottom wall of the forming head device 1, where operates a pusher 4 which in correct phase discharges the product from the lifting apparatus and inserts it into the forming head device, as shown in FIG. 4, with a working logic which will be later described. It is to be understood that the above mentioned means for the feeding of the product are merely indicative and that may be widely modified also according to particular operative requirements.

Over the inlet end of the device 1 from which enters the product P, there arrives and is passed the thermoplastic and stretchable film 5 for the wrapping of the same product, which by means of known and not illustrated means, is unwound in controlled manner by a bobbin placed in a suitable position for its substitution once it is exhausted. The film 5 longitudinally runs along the device 1 in the same travelling direction of the product P, winds itself up in such a manner to form a tube which contains the product and the edges of the same film are superimposed the one on the other for example in the lower portion of the forming head device 1 where operates a known device schematically indicated with the arrow 6, which welds reciprocally said edges with a longitudinal welding, substantially continuous and at tight seal. A forming head device and a longitudinal welding device useful for the machine which is referred to, are for example illustrated in document WO 02/066329 A1.

The forward end of the film tube 5 which exits from the forming head device 1, is transversally welded and is retained by a clamping, welding and cutting unit 7, shown with greater details and by way of example in FIG. 7, where it is noted that such unit comprises a welding bar 107 inferiorly provided with two rectilinear and parallel projections 207, 207', protected by a coating anti-adherent with respect to the film to be welded, which are heated by known means to the required temperature for the welding of the film and which co-operate with the corresponding surface, also protected by an anti-adherent coating, of a counter-welding bar 307 provided in the center-line of a recess 407 in which may penetrate a cutting blade 507 or any other suitable means projecting from the center line of said welding bar 107 which is assembled parallelly movable, with interposed a guide 607 made of suitable heat insulator and under the action of suitable means, in a structure 707 having inverted U-profile, whose wings are cooled by means of natural ventilation holes 807 and that with its parallel edges opposes the flat surface of the counter-welder 307, said edges being usually projecting with respect to the welding projections 207, 207'. The welder and the counter-welder of the unit 7 are connected to means schematically indicated by the arrows 8, which upon command parallelly move same close and far the one to the other with self-centring movement and are connected with known means for the alternate horizontal translation, as schematically indicated by the arrows 9. When the welder and the counter-welder of the unit 7 are reciprocally approached, the edges of the structure 707 touch first the counter-welder 307, to perform the function of sheet presser. In succession, because of the intervention of specific actuators or elastic means, not shown, the welder 107 moves close to the counter-welder and its heated projections 207, 207' and the blade 507 effect onto the interposed film two parallel weldings and an interposed cut. Once that the welding and the cutting have been effected, it is provided that the welder 107 slightly moves away from the counter-welder 307 which still remains in co-operation with the sheet presser structure 707 to temporarily retain the head and the tail of the welded tubular wrapping.

The double clamping, double welding and interposed cutting unit 7 comprises also a horizontal supporting plane 10 which is comb-shaped (see also FIG. 2a) overhangingly fixed on the side of the counter-welder 307 which is opposed to the one turned toward the forming head device 1.

The machine according to the invention comprises a second double clamping, double welding and interposed transversal cutting unit 7', which is exactly the same as the one indicated with numeral reference 7, parallel to this one and which with this one alternates upstream and downstream of the packages, with an operation logic which will be later described. The components and the movements of the unit 7' are analogous to the components and movements of unit 7 and are marked with the same numbers with the indication sign of "prime".

At a correct distance and aligned with the forming head unit 1 and downstream of this, there is provided a motorised comb conveyor 11 (see also FIG. 2a) constituted at least in its initial portion by horizontal belts, which are parallel and intercalated with respect to the prongs of the comb-shaped supporting plane 10, 10' of the devices 7, 7' above mentioned.

The machine is completed in its primary function of packaging machine, by means that in correct phase transversally block the tubular wrapping film of the product at the level of the discharging mouth of the forming head device 1. These means for example consist of rectilinear and parallel transversal pressers 12, 12', which upon command of suitable controls (not shown) are in correct phase transversally lowered upon the upper and lower portion of the discharging mouth by the internal tubular portion of the device 1, to be in contact with the film with a rubberised surface and to block the longitudinal sliding thereof upon the same device 1. Usually this pressers are in distant rest position, so the wrapping film 5 may freely slide on the wrapping device 1. The machine as described functions in the following manner.

From FIG. 1 it is noted that the tubular wrapping film which is coming out from the forming head device 1 has been welded and it is now retained by the device 7 which is closed and horizontally moves toward the right of said figure, while with synchronous movement a product P is inserted by the pusher 4 through the same device 1, in such a manner to engage the tubular packaging which is coming out from the same device with a slight longitudinal tension, as shown in FIG. 2 and in the plan view of FIG. 2*a*. During this phase, the device 7' is open and its components move in opposite direction with reference to the device 7 and are placed at a level so as to not interfere with this device. When the product has come out from the forming head device 1 for a portion of length which is sufficient and proportionate both to the dimensions of the same product and to the extensibility of the utilised film, there intervene the pressers 12, 12' which transversally block the tubular film on the discharging mouth of the device 1, while the device 7 continues in its horizontal displacement run from the device 1, in such a5 manner to subject the portion of tubular film which passes between such device and said pressers 12, 12', to a longitudinal stretch which is proportionate to the dimensions of the product and which, also due to the stretch and elastics features of the film, performs the two following functions:

a) causes that the wrapping lengthens to completely house the product which comes out from the device 1 and which follows the same wrapping because of the friction made by the film and for the possible action of the pusher 4 which in correct phase returns to its rest position to repeat the working cycle which it must perform, with the introduction in the forming head device 1 of a new product;

b) causes that in reaction to the stretch, the wrapping transversally narrows, in such a manner to tightly wrap the product, both in longitudinal direction and in transversal direction, as shown in FIGS. 3 and 3*a*.

In correct phase with the stretch of the wrapping being formed, the device 7', which has arrived in open condition immediately downwardly of the forming head device 1, closes itself in self-centring manner upon the tail of the portion of stretched wrapping in which is inserted a product P which is supported by the comb shaped plane 10' of the same device 7' which performs the welding of the tail of the formed packaging or wrapping Z, which welds the head of the following wrapping, which separates the wrappings with the intermediate cutting and that at the same time supports same with the function of gripper, following to the phases of welding and cutting, as described with reference to FIG. 7. In correct phase with respect to the operation of the device 7', the pressers 12, 12' are neutralised and return in the rest condition. While the transversal weldings performed by the devices 7, 7' cool down and acquire the required consistence, the whole of the same devices moves horizontally away from the forming head device 1, while a new product P is inserted in the wrapping controlled by the device 7', with the same succession of above mentioned phases. In correct phase the upstream device 7 opens and inverts its run to return at the level of the forming head device 1, as shown in FIG. 5, while the formed wrapping Z, supported by means of the device 7', is placed above the conveyor 11 and then it is placed upon said conveyor following to the opening of the same device 7', for its return to the working cycle, as shown in the succession of FIGS. 5 and 6. In the moment in which the wrapping Z is abandoned by the upstream device 7, as shown in FIG. 5, the stretchable film which composes same, because of its elastic memory, becomes shorter and completely adheres in a close and strict manner to the tray which contains the product. It is clear how, thanks to the alignment between the feeding flow of the product and the travelling direction of the wrapping, the machine can operate with speeds which are much greater with respect to the speeds of the packaging machines mentioned in the introduction of the present description. It is also clear how the wrappings Z result to be perfectly tight-seal and can perfectly isolate the product from the contact with the atmosphere, when there is used a barrier effect film 5. Inside the wrappings Z it will be possible to create a modified atmosphere and suitable for the conservation of the wrapped product, for example housing at least the initial portion of the machine in a tight-sealed chamber inside of which there is created and maintained the required atmosphere, or, as shown in the drawings, providing a delivery system 13 inside of the forming head device 1, for example in the upper and/or lateral portion of this one, which enters from the inlet mouth of the device and which is connected to an external support structure 14 at the level of which there is connected a feeding duct 113 for the gas mixture which by means of suitable nozzles 15 is introduced inside the packaging being formed. The active portion of the pusher 4 may be suitably shaped and for example provided with tubular means (not shown) projecting inside the packaging being formed and connected to blow and/or suction ducts to promote the formation in the package of the modified atmosphere, and may be connected to derivations of the duct 113 above mentioned and/or to a suction source. It is to be understood that the devices for the formation devices of the modified atmosphere, may be conceived to create a correct depression inside of the packaging. There must be stated that the whole device may be characterised by a light slope in the travelling direction of the wrapping film, so that the discharge from the forming head device 1 of the product to be packaged, as shown also in the phases of the FIGS. 1 and 2, may be favoured also by the force of gravity.

In the packaging of the food products for which it is necessary to respect several parameters of the chain of cold, the machine is often compelled to work in environments with limited temperature values, which limit the stretchability of the used film and which requires the application of remarkable stretch stresses by the same film. To obviate this and other drawbacks, downstream of the tubularisation mandrel of the film, there are provided several transversal bars which deliver upon the same film warm air at a correct temperature. These bars are maintained active during the longitudinal travelling of the film and are de-activated when the film is transversally blocked for its arrangement to the longitudinal extension phase, in such a manner to not subject the said film to localised and concentrated overheating. With this solution, the longitudinal stress of the film is reduced, it is possible to utilise the maximum stretchability of the utilised film even if the machine operates in environments with a limited temperature, and the portion of stretched film adheres more closely to the inner tray with the product to be packaged.

Figure 9:
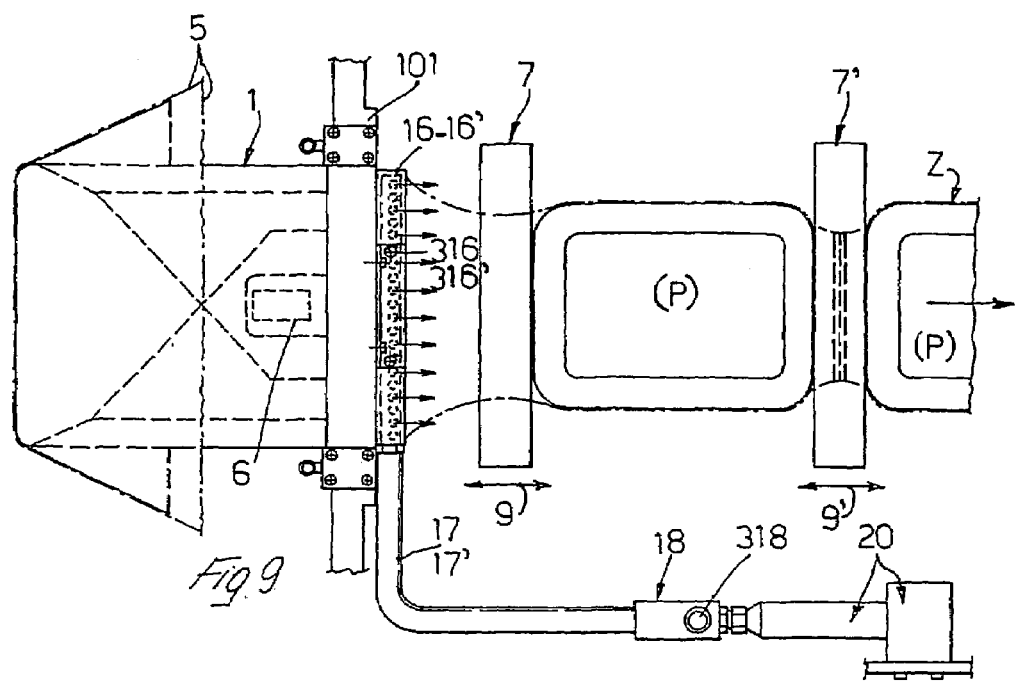
Figure 10:
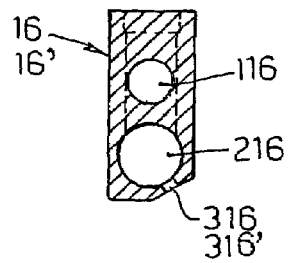
FIGS. 10 and 11 are respectively views in longitudinal section and in transversal section of one of the warm air delivery bars for the heating of the film downstream of the mandrel for the tubularisation of the machine as from FIG. 8.
Figure 11:
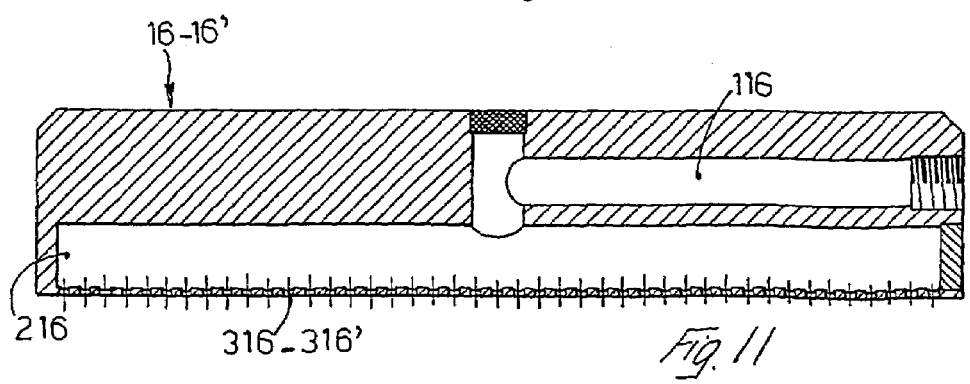

From FIGS. 8 and 9 it is noted that immediately downstream and parallelly to the pressers 12, 12', are provided diffusion bars 16, 16' realised with any suitable thermoinsulating technopolymer, fixed to the structure which carries said pressers, having a such length to interest the packaging film for the whole of its width and also on the sides and placed at a short distance from the path of the film tubular wrapping which comes out from the mandrel 1, for example at a distance comprised between 5 and 20 mm, for example of about 12 and 15 mm. From FIGS. 10 and 11 it is noted that the bars 16, 16' are longitudinally provided with a channel 116 having the function of manifold, which interests the same for half of their length and that with the internal extremity opens into a diffusion channel 216 which interests the bars for the whole of their length and that with respect to the previous is more near to the side of the bar which is turned toward the film and it is closed at both extremities. With the outer end of the channel 116, the bars 16, 16' are connected by means of thermoresistant ducts 17, 17', to the corresponding outlets 218, 218' of a distributor box 18 that by means of a terminal 19, controlled for example by means of a pneumatic solenoid valve 119 from the processor of the packaging machine (see further), may be carried from the condition which contemplates the inlet 118 connected with said outlets 218, 218', or connected with a mouth 318 which discharges away from the film. With the inlet mouth 118, the box 18 is connected to a warm air generator 20 in its turn connected with its terminal 120 with electric feeding means and for the control of the heating temperature to the pre-established value, for example comprised between 60° and 90° C. and which with the inlet 220 it is connected to a source 21 for the continuous feeding of the air under pressure, by means of a pressure regulator 22. The pressure of the air which is leaving the regulator 22 is for example comprised between 0.1 and 1 bar. In the box 18 there is housed a thermal sensor 23 which generates an electrical signal which is proportional to the temperature of the air heated by means of the unit 20 and which at the same time detects the presence or the absence of the flow of the same air. The sensor 23 is connected to a logic circuit 24 with a programming and control terminal 25 in its turn connected to a power interface 26 which feeds in 120 the generator 20, in such a manner to maintain constant and at the-pre-established values the temperature of the heated air produced by this one. The warm and pressurised air which arrives in the diffusion channel 216 of the bars 16, 16', comes out from these through a plurality of small holes 316, 316', having a diameter for example which is comprised between 1 and 4 mm with a distance between centers which is about double of their diameter, provided on the portion of the same bars which is turned toward the tubular film connection which comes out from the forming head device 1, 6 and which preferably is such that the warm air flow delivered by said holes, accompanies the said packaging in the advance direction. The parameters above mentioned are referred to the use of stretchable films with a thickness of about 40 micron, so it is clear that they can vary in relation to the thickness and/or other features of the used packaging film.

The improved packaging machine operates in the following manner. From FIG. 8 it is noted that the tubular wrapping film which is coming out from the forming head device 1, has been transversally welded and it is retained by its head by the device 7' which is closed and which moves horizontally towards the right, while in correct phase a product P has been inserted by the pusher 4 trough the guide 1' of the same forming head device 1, in such a manner to engage the tubular wrapping which comes out from said forming head device with a slight longitudinal stretch. During this phase, the device 7 is open, its components have moved in an opposite direction to the device 7' and are placed at such level as to not interfere with this device. The box 18 is controlled by the processing unit of the machine, in such a manner that the bars 16, 16' are connected to the generator 20 when the tubular film comes out from the forming head device 1, 6 so that the same film results uniformly licked by the warm air for the whole of its transversal extension, sides comprised. When the tubular wrapping has come out from the forming head device 1 for a portion of its length which is sufficient and proportionate both to the dimensions of the inner product and to the stretchability of the utilised film, it can be supposed that the first pressers 12, 12' intervene to transversally block the tubular film on the discharging mouth of the internal guide 1' of the forming head device 1, while the device 7' continues its horizontal movement away from the forming head 1, in such a manner to submit the tubular film which passes between said device and said pressers 12, 12' to a longitudinal stretch proportionate to the dimensions of the product and that, also due to the stretchability and elastic features of the film, performs the following functions already mentioned:

a) it causes that the wrapping stretches to completely house the product which comes out from the guide 1' of the forming head 1 and which follows the said wrapping due to the friction exerted by the film and due to the possible action of the pusher 4 which in correct phase returns to its rest position to repeat its cycle, with the introduction of a new product in the guide 1' of the forming head 1;

b) it causes that as a reaction to the stretch, the wrapping transversally narrows and strictly wraps the product, both in the longitudinal and in the transversal direction.

When the advance movement of the film is blocked and intervene the pressers 12, 12', the box 18 switches in correct phase to discharge the warm air through the exhaust orifice 318, de-activating the diffusion bars 16, 16' which, thanks to the material of which are composed, result to be substantially without thermal inertia and do not subject the film to localised and concentrated overheating. When the tubular wrapping which has inside the product P to be packaged, is longitudinally stretched by means of the double welding and interposed cutting unit 7 which operates downstream of the same product, the portion of film which is interested by the longitudinal stretch, has been previously heated by the warm air delivered by the diffusion bars 16, 16', so that its extensibility results to be increased, the film adheres more closely to the tray with the product and the stretching stress of the said film results to be sensibly reduced, even if the machine works in a environment with a limited temperature. In correct phase with the stretch of the wrapping being formed, the device 7 which arrived in open condition immediately downstream of the forming head device 1, closes in self-centering manner on the tail of the portion of stretched packaging in which there is inserted the product P and which is supported by the comb 10 of the same device 7 which performs the welding on the tail of the formed confection, which welds the head of the next packaging, which separates the packages with an intermediate cutting and which at the same time supports same acting as a gripper following to the welding and cutting phases. In correct phase with the intervention of the device 7, the pressers 12, 12' are neutralised and return to the rest position. While the transversal weldings performed by the devices 7, 7' cool down and acquire the required-consistence, the whole of the said devices moves horizontally apart from the forming head device 1, while a new product P is inserted in the wrapping controlled by the device 7, with the same succession of the phases above mentioned. In correct phase the upstream device 7' opens and inverts its run to return at the level of the forming head device 1, while the formed packaging Z, supported by the device 7', is positioned upon the conveyor 11 and then rests upon said conveyor following to the opening of said device 7'. In the instant in which the packaging Z is abandoned by the upstream device 7', the stretchable film which composes it, because of its elastic memory, becomes shorter and completely adheres in a close and strict manner to the tray which contains the product.

It has been noted that the transversal gripping of the tubular film over and under the discharging mouth of the complex of the tubularisation forming head, by means of corresponding upper and lower transversal pressers, left free the lateral portion of the tubular film which transmitted unbalanced stresses on the film both upstream and downstream, with the risk of modifying the correct positioning of the same film on the forming head device and particularly in the spatial relation with the means for the longitudinal welding. To obviate these drawbacks, there can be arranged in combination with the lower and upper pressers, lateral pressers to block also laterally the film, or there can be used an annular presser pre-arranged for a centripetal expansion, to block the tubular wrapping with an annular gripping, obviously arranging suitable contrasting means also on the sides of the outlet mouth of the tubularisation mandrel. Alternatively to these solutions, which may cause an inevitable constructive complication of the machine, recourse has been made to a more simple solution hereinafter described.

From FIG. 8 it is noted that upstream of the tightening dancer (not illustrated) which is usually provided after the feeding bobbin and before the tubularisation head device 1, the film 5, which is still in the flat condition, passes through a group of parallel rollers 27, transversal to the same film, the intermediate 127 of which is rubber-coated. These rollers were initially idle rollers. There has been provided a connection between the rubber roller 127 with means 28 which upon command may stop it, for example motion means with brake or electromagnetic brake, to stop the film in the phase of longitudinal stretch as from FIGS. 8 and 9, with a blocking upstream of the forming head device 1, and no more with a blocking downstream by means of the pressers 12, 12', which can be therefore eliminated. It is clear how the diffusion bars 16, 16' above mentioned may be placed upon the same structures which before supported the pressers 12, 12' and instead of these. From the tests effected it has been observed that the film stopped through the rubber coated roller 127, reacts in a more distributed and uniform manner with respect to the said longitudinal stretch phase and it is not subjected to undesired and prejudicial displacement of the portions placed at the level of the longitudinal welding means 6 and this probably happens thanks also to the heating performed upon the film of the packaging being formed, which causes that the effects of the longitudinal stretch alternatively exerted by the means 7, 7' prevalently are discharged upon the portion of heated film and not on the portion upstream which is still investing the forming head device 1. In FIG. 8, with the numeral reference 29 there is indicated the main processor of the machine, with the programming and inquiry inlet 129. To the processor 29 arrives the electrical signal from the means 30 which detect the dimensions of the product P to be packaged, in function of which the same processor will provide to control in a logical manner the run of the pusher 4, the horizontal run of the clamping, double welding and interposed cutting units 7, 7' also with reference to the discharging conveyor 11, and which is controlling the electromagnetic brake 28, the distributor box 18, the activation and de-activation means of the longitudinal welding device 6, and other possible operating members of the machine, comprising those which are not illustrated here which if required provide for the introduction of the conservation gases in the packaging cyclically formed.

From FIG. 12 it is finally noted that the upper components of the units 7 and 7' which alternatively move upstream and downstream of the packagings being formed, may be provided with contrasting means 31, 31', the positioning of which is adjustable or self-adjustable in function of the height of the trays containing the product, which, when said units are activated for the transversal gripping of the film, touch superiorly the packaging. These components maintain the packaging correctly arranged on the combs 10 or 10' when the same packaging remains retained only by means of the rearly arranged of said units 7 or 7' which accompany the same packaging on the displacement conveyor 11. The presence of the components 31, 31' is particularly useful when the packaged product is very light and for this reason could be disorderly upset upon the underlying comb 10 or 10' by the effects of the elastic retraction of the film which wraps the same product. It must be noted that when the packaged product is deposited upon the conveyor 11, the unit 7 or 7' which accompanies the same is in the opening phase, so that the contrast means 31 or 31' of said unit is distant from the same product and does not interfere negatively with this one. It is clear how this condition simplify in remarkable manner the realisation of the contrast means 31, 31'.

From FIGS. 12 and 13 it is noted that when the packaging Z is deposited upon the conveyor 11, the same passes through a heat-treatment tunnel 32 which, as a function of the travelling speed of the same conveyor and of the thickness of the above mentioned film, blows on the packaging a quantity of air which is variable, for example, between 20 and 40 mc/h, at a temperature which is comprised, for example, between 55 and 90° C., for example of about 60–80° C. This heat-treatment causes that the effects of the elastic retraction of the film previously stretched are magnified and uniformly distributed and that the packaging results without upper and lateral imperfections with advantages also of aesthetical character. Always for this latter purpose, the unit 7 and 7' are pre-arranged in such a manner to close preferably at a lower level with respect to the upper edge of the tray with the product P to be packaged, in such a manner that the heat-sealed zones arrange themselves in the lateral and/or low portion of the same packaging and result scarcely visible.

According to a possible embodiment the tunnel 32 is for example made by means of a pair of hollow diffusers 132, 132', with an obtuse angle shape, laterally fixed to the support frame of the conveyor 11, which are presenting the more projecting portion above said conveyor, which are provided with discharging openings for example having a rectangular shape, with their greatest dimension parallel to the travelling direction of the packaging, and placed laterally and over the conveyor 11. In these openings are assembled grids made by heating elements 33, 33', of which the side ones have for example a power of about 1000 W and each one of the upper ones has a power of about 700 W. The diffusers 132, 132' are connected by means of the duct 232, 232' to at least a feeding source of air at the correct values of pressure and flow values.

The invention claimed is:

1. Machine for the packaging of products with stretchable and thermoplastic film, characterized by the fact of comprising:
   tubularization means comprising a tubular forming head device having an inlet and an outlet, for the tubularization of a wrapping film taken from a feeding bobbin and means for the longitudinal tight-seal welding of the superimposed edges of such tubularization film;
   means which alternate in the transversal grip of the head of the tubular wrapping which comes out from said tubularization means, which are pre-arranged for the longitudinal movement of said wrapping, to longitudinally stretch it and to perform on same at least two transversal, parallel and tight seal weldings, a transversal cut placed between the said weldings and to retain the wrapping upstream and downstream of the two welded zones separated by the cut;
   means for the cyclical introduction of a product through the inlet of said tubularization means and through the outlet of said tubularization means thereby advancing the tubular wrapping film;
   means to temporarily support the film wrapped packaging being formed downstream of said tubularization means;
   means to brake the forward movement of the tubular wrapping film by pressing it against the outlet end of said forming head device to longitudinally stretch the wrapping in its formation phase, under the action of the active introducing means and one of said gripping, double welding and interposed cutting means; and
   a conveyor for the taking and the moving away of the cyclically formed packaging.

2. Machine according to claim 1, in which the forming head device is in an almost horizontal position, provided with a tubular core with and inlet end and an outlet end and external portions for the tubularisation upon said core of the wrapping film, said device being provided with a section of adjustable amplitude if required and suitable to be traversed with clearance by the products to be packaged which enter from the inlet end of said device from which enters the thermoplastic and stretchable film, unwound from a bobbin and controlled by feeding means and which in its longitudinal traversing of said device, is bent to the shape of continuous tube and its longitudinal edges are superimposed and reciprocally welded with at least a longitudinal seal welding, performed by means placed for example in the lower portion of the forming head device.

3. Machine according to claim 1, in which means are provided to cyclically arrange a product in front of the inlet end or mouth of the forming head device, where, in longitudinal alignment with said device, there acts a pusher activated by rectilinear alternating motion actuators, which upon command inserts a product to be packaged in the forming head device, accompanying same for a correct length beyond the outlet end or discharging mouth and then moving back to the rest position for the repetition of a new feeding cycle.

4. Machine according to claim 1, in which the pair of double gripping, double welding and cutting means between the two weldings, placed downstream of the forming head device, transversally to the path of the tubular wrapping film, which means are parallel between them, which alternate in the gripping of the head and of the tail of the packaging being formed, to retain the said packagings and to perform the longitudinal stretching of the packaging which is cyclically in the formation phase, comprise each a preferably upper welding bar, suitable to perform on the wrapping film two parallel weldings in co-operation with a lower bar, having the function of counter-welder and comprise means for the transversal cutting of the film, parallelly placed between the means which form the said two weldings, and comprise upstream and downstream of said welding means, means to grip the portion of film subjected to the welding and to retain it also when the said welding bar is by means of suitable means partially moved away from the counter-welder after the execution of the weldings, means being provided to move near and to move away between them the two components of each unit, with a rectilinear and self-centering movement, and means being provided for the horizontal transfer of the same units, firstly closed and moving away from the forming head device, and then open and towards to said device.

5. Machine according to claim 1, in which the packaging which is cyclically closed in the posterior end, is supported by a comb-shaped horizontal plane, mounted in a projecting manner on the front side of the lower bar having the function of counter-welder for each of said units for the double clamping, double welding and cutting of the tubularised packaging film.

6. Machine according to claim 1, in which a horizontal and motorized conveyor is provided at the end of the horizontal run of said double clamping, double welding and interposed cutting units, said conveyor being formed, at least in its initial portion by a comb assembly of parallel conveyor belts, between which can penetrate the prongs of said comb-shaped horizontal plane which in correct phase delivers upon said belts the packaging cyclically formed, for its removal from the packaging station.

7. Machine according to claim 2, in which the means placed over and under the discharging mouth of the tubular core of the forming head device, are made by pressers presenting a rubberized surface which upon command are pushed with the rubber surface against the walls of said tubular core of the forming head device, to block on these the tubularised wrapping film in the phase in which this must be longitudinally stretched by the cyclically active device for the double clamping, double welding and interposed cutting.

8. Machine according to claim 1, characterized by the fact of utilizing barrier effect stretchable film, and comprising means to create in the packaging being formed, prior to the transversal closing of its posterior end, a modified atmosphere useful for the conservation of the product to be packaged.

9. Machine according to claim 8 in which in the inlet mouth of the forming head device are longitudinally inserted in such position as to not interfere with the product to be packaged cyclically inserted in said device, means supported by external means connected to external operative means and which by using nozzles create in the packaging being formed the required modified atmosphere, with the immission in the packaging of a mixture of gases and/or with the suction of the environmental air.

10. Machine according to claim 8, in which said means for introducing the product comprising a pusher which cyclically inserts a product in the packaging station, and which is suitably shaped and provided with tubular means projecting inside the packaging being formed and connected to blow and/or suction ducts such to promote the formation in the package of the required conservation atmosphere of the product to be packaged.

11. Machine according to the claim 1, characterized by a slight longitudinal inclination or slope in the run direction of the product to be packaged.

12. Machine according to claim 1, characterized by the fact of comprising downstream of the film tubularisation means, means for the blow-in of warm air at a correct temperature on the tubularised wrapping while the same moves longitudinally, to better predispose the same wrapping to the subsequent longitudinal stretching and close packaging operation of the inner product.

13. Machine according to claim 12, in which the blow means for the warm air on the tubular wrapping comprise rectilinear bars, transversally placed, over and under the wrapping which comes out from the forming head device, said bars being placed at a short distance from the film, being provided with a plurality of small holes oriented in such a manner that the warm air delivered by these lick up the film accompanying the same in its forward run, said bars being realized with a thermal insulating material and being connected by means of thermo-resistant ducts to a deviation box in its turn connected to a unit which delivers warm and pressurized air, means being provided for the control of said box to cause it to deliver the warm air to said diffusion bars, when the packaging film runs longitudinally and to cause that the same box commutes to discharge the warm air through an exhaust duct in correct phase with the stop of the longitudinal run of the film and with the intervention of transversal blocking means of the packaging film.

14. Machine according to claim 13, in which the blow in bars for the warm air on the tubularised wrapping, are placed with a distance from the same wrapping which is comprised between 5 and 20 mm, for example of about 12–15 mm.

15. Machine according to claim 13, in which the blow-in bars for the warm air are provided with delivery holes with a diameter comprised between 1 and 4 mm and with a distance between centers which is about the double of their diameter.

16. Machine according to claim 13, in which are provided means to cause that the unit which feeds warm and pressurized air to the deviation box feeds the same air at constant values of pressure and temperature.

17. Machine according to claim 16, in which at the level of the inlet mouth of the deviation box there is assembled a temperature probe connected to a logic circuit provided with a programming and control terminal and connected to a power interface which electrically feeds the generator for the heating of the air, in such a manner to maintain constant and to the pre-established values the temperature of the warm air produced by this one.

18. Machine according to claim 16, in which the air is fed under pressure to the electric heating unit by means of a pressure regulator.

19. Machine according to claim 16, further comprising a means for the thermo-regulation of the warm air blown onto the tubular wrapping by the blow-in bars are such that the said warm air reaches the stretchable film, if the same has a thickness of about 40 micron, with a temperature which is comprised between 55° and 90°.

20. Machine according to claim 16, in which the pressure of the warm air fed by the feeding bars which act on stretchable films with a thickness of about 40 micron, is comprised between 0,1 and 1 bar.

21. Machine according to claim 1 characterized by the fact that the double clamping, double welding and interposed cutting units, which alternate upstream and downstream of the packaging being formed, comprise an upper component which carries a pertinent contrast means which superiorly touches the same package to maintain the same correctly arranged onto the underlying resting means and to ensure a correct deposition on the final discharging conveyor.

22. Machine according to claim 1 characterized by the fact that it comprises means to externally heat the packaging in the discharging phase on the relative conveyor.

23. Machine according to claim 22 in which said heating means blow warm air at a correct temperature on the upper portion and at least on the opposite sides of the package in the discharging phase.

24. Machine according to claim 23 characterized by the fact that the package is made by film with a thickness of about 40 micron, and said heating means blow warm air at a temperature which is comprised between 55 and 90° C., for example between 60 and 80° C.

25. Machine according to claim 24, in which said heating means are fed with an air flow of about 20–40 mc/h.

26. Machine according to claim 23, in which said heating means comprise fixedly arranged diffusers with electric heating grids mounted on the diffusion air openings and comprise means which feed to the same diffusers air with correct values of pressure and flow.

27. Machine according to the claim 1, characterized by the fact that a general processor controls the functioning of the same and is connected to means which detect the dimensions of the products to be packaged to subordinate to such dimensions the work of all the components of the machine.

* * * * *